US010346174B2

(12) United States Patent
McGlone et al.

(10) Patent No.: US 10,346,174 B2
(45) Date of Patent: Jul. 9, 2019

(54) OPERATION OF A MULTI-SLICE PROCESSOR WITH DYNAMIC CANCELING OF PARTIAL LOADS

(71) Applicant: International Business Machines Corporation, Armonk, NY (US)

(72) Inventors: Elizabeth A. McGlone, Rochester, MN (US); Jennifer L. Molnar, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 15/079,452

(22) Filed: Mar. 24, 2016

(65) Prior Publication Data
US 2017/0277543 A1 Sep. 28, 2017

(51) Int. Cl.
G06F 9/38 (2018.01)
G06F 9/30 (2018.01)
G06F 13/362 (2006.01)

(52) U.S. Cl.
CPC ........ G06F 9/3851 (2013.01); G06F 9/30043 (2013.01); G06F 13/362 (2013.01)

(58) Field of Classification Search
CPC .................................................. G06F 9/3851
See application file for complete search history.

(56) References Cited

U.S. PATENT DOCUMENTS

| 4,858,113 A | 8/1989 | Saccardi |
| 5,055,999 A | 10/1991 | Frank et al. |
| 5,095,424 A | 3/1992 | Woffinden et al. |
| 5,353,426 A | 10/1994 | Patel et al. |
| 5,418,922 A | 5/1995 | Liu |
| 5,471,593 A | 11/1995 | Branigin |
| 5,475,856 A | 12/1995 | Kogge |

(Continued)

FOREIGN PATENT DOCUMENTS

| CN | 101021778 A | 8/2007 |
| CN | 101676865 A | 3/2010 |

(Continued)

OTHER PUBLICATIONS

Roth, *Store Vulnerability Window (SVW): Re-Execution Filtering for Enhanced Load/Store Optimization*, Technical Reports (CIS), Paper 35, Jan. 2004, 23 pages, University of Pennsylvania Scholarly Commons (online), <https://repository.upenn.edu/cgi/viewcontent.cgi?referer=https://www.google.com/&httpsredir=1&article=1023&context=cis_reports>.

(Continued)

*Primary Examiner* — Andrew Caldwell
*Assistant Examiner* — Michael J Metzger
(74) *Attorney, Agent, or Firm* — Nathan M. Rau

(57) ABSTRACT

Operation of a multi-slice processor that includes a plurality of execution slices and a plurality of load/store slices, where the multi-slice processor is configured to dynamically cancel partial load operations by, among other steps, receiving a load instruction requesting multiple portions of data; receiving a load instruction requesting multiple portions of data; determining that a load of one portion of the requested multiple portions is unavailable to be issued; and responsive to determining that the load of the one portion of the requested multiple portions is unavailable to be issued, delaying issuance of the load instruction.

20 Claims, 5 Drawing Sheets

(56) References Cited

U.S. PATENT DOCUMENTS

| | | | |
|---|---|---|---|
| 5,553,305 A | 9/1996 | Gregor et al. | |
| 5,630,149 A | 5/1997 | Bluhm | |
| 5,664,215 A * | 9/1997 | Burgess | G06F 9/30043 |
| | | | 712/215 |
| 5,680,597 A | 10/1997 | Kumar et al. | |
| 5,724,536 A * | 3/1998 | Abramson | G06F 9/30043 |
| | | | 712/216 |
| 5,809,522 A | 9/1998 | Novak et al. | |
| 5,809,530 A | 9/1998 | Samra et al. | |
| 5,822,602 A | 10/1998 | Thusoo | |
| 5,897,651 A | 4/1999 | Cheong et al. | |
| 5,913,048 A | 6/1999 | Cheong et al. | |
| 5,996,068 A | 11/1999 | Dwyer, III et al. | |
| 6,021,485 A | 2/2000 | Feiste et al. | |
| 6,026,478 A | 2/2000 | Dowling | |
| 6,044,448 A | 3/2000 | Agrawal et al. | |
| 6,073,215 A | 6/2000 | Snyder | |
| 6,073,231 A | 6/2000 | Bluhm et al. | |
| 6,092,175 A | 7/2000 | Levy et al. | |
| 6,098,166 A | 8/2000 | Leibholz et al. | |
| 6,108,753 A | 8/2000 | Bossen et al. | |
| 6,112,019 A | 8/2000 | Chamdani et al. | |
| 6,119,203 A | 9/2000 | Snyder et al. | |
| 6,138,230 A | 10/2000 | Hervin et al. | |
| 6,145,054 A | 11/2000 | Mehrotra et al. | |
| 6,170,051 B1 | 1/2001 | Dowling | |
| 6,269,427 B1 | 1/2001 | Kuttanna et al. | |
| 6,212,544 B1 | 4/2001 | Borkenhagen et al. | |
| 6,237,081 B1 | 5/2001 | Le et al. | |
| 6,286,027 B1 | 9/2001 | Dwyer, III et al. | |
| 6,311,261 B1 | 10/2001 | Chamdani et al. | |
| 6,336,168 B1 | 1/2002 | Frederick, Jr. et al. | |
| 6,336,183 B1 | 1/2002 | Le et al. | |
| 6,356,918 B1 | 3/2002 | Chuang et al. | |
| 6,381,676 B2 | 4/2002 | Aglietti et al. | |
| 6,418,513 B1 | 7/2002 | Arimilli et al. | |
| 6,418,525 B1 | 7/2002 | Charney et al. | |
| 6,425,073 B2 | 7/2002 | Roussel et al. | |
| 6,463,524 B1 | 10/2002 | Delaney et al. | |
| 6,487,578 B2 | 11/2002 | Ranganathan | |
| 6,549,930 B1 | 4/2003 | Chrysos et al. | |
| 6,553,480 B1 | 4/2003 | Cheong et al. | |
| 6,564,315 B1 | 5/2003 | Keller et al. | |
| 6,654,876 B1 | 11/2003 | Le et al. | |
| 6,728,866 B1 | 4/2004 | Kahle et al. | |
| 6,732,236 B2 | 5/2004 | Favor | |
| 6,839,828 B2 | 1/2005 | Gschwind et al. | |
| 6,847,578 B2 | 1/2005 | Ayukawa et al. | |
| 6,868,491 B1 | 3/2005 | Moore | |
| 6,883,107 B2 | 4/2005 | Rodgers et al. | |
| 6,944,744 B2 | 9/2005 | Ahmed et al. | |
| 6,948,051 B2 | 9/2005 | Rivers et al. | |
| 6,954,846 B2 | 10/2005 | Leibholz et al. | |
| 6,978,459 B1 | 12/2005 | Dennis et al. | |
| 7,020,763 B2 | 3/2006 | Saulsbury et al. | |
| 7,024,543 B2 | 4/2006 | Grisenthwaite et al. | |
| 7,086,053 B2 | 8/2006 | Long et al. | |
| 7,093,105 B2 | 8/2006 | Webb, Jr. et al. | |
| 7,100,028 B2 | 8/2006 | McGrath et al. | |
| 7,114,163 B2 | 9/2006 | Hardin et al. | |
| 7,124,160 B2 | 10/2006 | Saulsbury et al. | |
| 7,155,600 B2 | 12/2006 | Burky et al. | |
| 7,191,320 B2 | 3/2007 | Hooker et al. | |
| 7,263,624 B2 | 8/2007 | Marchand et al. | |
| 7,290,261 B2 | 10/2007 | Burky et al. | |
| 7,302,527 B2 | 11/2007 | Barrick et al. | |
| 7,350,056 B2 | 3/2008 | Abernathy et al. | |
| 7,386,704 B2 | 6/2008 | Schulz et al. | |
| 7,395,419 B1 | 7/2008 | Gonion | |
| 7,398,374 B2 | 7/2008 | Delano | |
| 7,401,188 B2 | 7/2008 | Matthews | |
| 7,469,318 B2 | 12/2008 | Chung et al. | |
| 7,478,198 B2 | 1/2009 | Latorre et al. | |
| 7,478,225 B1 | 1/2009 | Brooks et al. | |
| 7,490,220 B2 | 2/2009 | Balasubramonian et al. | |
| 7,509,484 B1 | 3/2009 | Golla et al. | |
| 7,512,724 B1 | 3/2009 | Dennis et al. | |
| 7,565,652 B2 | 7/2009 | Janssen et al. | |
| 7,600,096 B2 | 10/2009 | Parthasarathy et al. | |
| 7,669,035 B2 | 2/2010 | Young et al. | |
| 7,669,036 B2 | 2/2010 | Brown et al. | |
| 7,685,410 B2 | 3/2010 | Shen et al. | |
| 7,694,112 B2 | 4/2010 | Barowski et al. | |
| 7,707,390 B2 | 4/2010 | Ozer et al. | |
| 7,721,069 B2 | 5/2010 | Ramchandran et al. | |
| 7,793,278 B2 | 9/2010 | Du et al. | |
| 7,836,317 B2 | 11/2010 | Marchand et al. | |
| 7,889,204 B2 | 2/2011 | Hansen et al. | |
| 7,890,735 B2 | 2/2011 | Tran | |
| 7,926,023 B2 | 4/2011 | Okawa et al. | |
| 7,949,859 B2 | 5/2011 | Kalla et al. | |
| 7,975,134 B2 | 7/2011 | Gonion | |
| 7,987,344 B2 | 7/2011 | Hansen et al. | |
| 8,041,928 B2 | 10/2011 | Burky et al. | |
| 8,046,566 B2 | 10/2011 | Abernathy et al. | |
| 8,074,224 B1 | 12/2011 | Nordquist et al. | |
| 8,099,556 B2 | 1/2012 | Ghosh et al. | |
| 8,103,852 B2 | 1/2012 | Bishop et al. | |
| 8,108,656 B2 | 1/2012 | Katragadda et al. | |
| 8,131,942 B2 | 3/2012 | Harris et al. | |
| 8,131,980 B2 | 3/2012 | Hall et al. | |
| 8,135,942 B2 | 3/2012 | Abernathy et al. | |
| 8,140,832 B2 | 3/2012 | Mejdrich et al. | |
| 8,141,088 B2 | 3/2012 | Morishita et al. | |
| 8,151,012 B2 | 4/2012 | Kim et al. | |
| 8,166,282 B2 | 4/2012 | Madriles et al. | |
| 8,184,686 B2 | 5/2012 | Wall et al. | |
| 8,219,783 B2 | 7/2012 | Hara | |
| 8,219,787 B2 | 7/2012 | Lien et al. | |
| 8,243,866 B2 | 8/2012 | Huang et al. | |
| 8,250,341 B2 | 8/2012 | Schulz et al. | |
| 8,271,765 B2 | 9/2012 | Bose et al. | |
| 8,325,793 B2 | 12/2012 | Zhong | |
| 8,335,892 B1 | 12/2012 | Minkin et al. | |
| 8,386,751 B2 | 2/2013 | Ramchandran et al. | |
| 8,402,256 B2 | 3/2013 | Arakawa | |
| 8,412,914 B2 | 4/2013 | Gonion | |
| 8,464,025 B2 | 6/2013 | Yamaguchi et al. | |
| 8,489,791 B2 | 7/2013 | Byrne et al. | |
| 8,521,992 B2 | 8/2013 | Alexander et al. | |
| 8,555,039 B2 | 10/2013 | Rychlik | |
| 8,578,140 B2 | 11/2013 | Yokoi | |
| 8,654,884 B2 | 2/2014 | Kerr | |
| 8,656,401 B2 | 2/2014 | Venkataramanan et al. | |
| 8,683,182 B2 | 3/2014 | Hansen et al. | |
| 8,713,263 B2 | 4/2014 | Bryant | |
| 8,793,435 B1 | 7/2014 | Ashcraft et al. | |
| 8,806,135 B1 | 8/2014 | Ashcraft et al. | |
| 8,850,121 B1 | 9/2014 | Ashcraft et al. | |
| 8,929,496 B2 | 1/2015 | Lee et al. | |
| 8,935,513 B2 | 1/2015 | Guthrie et al. | |
| 8,966,232 B2 | 2/2015 | Tran | |
| 8,984,264 B2 | 3/2015 | Karlsson et al. | |
| 9,069,563 B2 | 6/2015 | Konigsburg et al. | |
| 9,207,995 B2 | 12/2015 | Boersma et al. | |
| 9,223,709 B1 | 12/2015 | O'Bleness et al. | |
| 9,519,484 B1 | 12/2016 | Stark | |
| 9,665,372 B2 | 5/2017 | Eisen et al. | |
| 9,672,043 B2 | 6/2017 | Eisen et al. | |
| 9,690,585 B2 | 6/2017 | Eisen et al. | |
| 9,690,586 B2 | 6/2017 | Eisen et al. | |
| 9,720,696 B2 | 8/2017 | Chu et al. | |
| 9,740,486 B2 | 8/2017 | Boersma et al. | |
| 9,760,375 B2 | 9/2017 | Boersma et al. | |
| 9,934,033 B2 | 4/2018 | Cordes et al. | |
| 9,940,133 B2 | 4/2018 | Cordes et al. | |
| 9,983,875 B2 | 5/2018 | Chadha et al. | |
| 10,037,211 B2 | 7/2018 | Fernsler et al. | |
| 10,037,229 B2 | 7/2018 | Fernsler et al. | |
| 10,042,647 B2 | 8/2018 | Eickemeyer et al. | |
| 10,042,770 B2 | 8/2018 | Chadha et al. | |
| 2002/0078302 A1 | 6/2002 | Favor | |
| 2002/0138700 A1 | 9/2002 | Holmberg | |
| 2002/0194251 A1 | 12/2002 | Richter et al. | |

(56) References Cited

U.S. PATENT DOCUMENTS

| | | |
|---|---|---|
| 2003/0120882 A1 | 6/2003 | Granston et al. |
| 2003/0163669 A1 | 8/2003 | Delano |
| 2003/0182537 A1 | 9/2003 | Le et al. |
| 2004/0111594 A1 | 6/2004 | Feiste et al. |
| 2004/0162966 A1 | 8/2004 | James Webb, Jr. et al. |
| 2004/0172521 A1 | 9/2004 | Hooker et al. |
| 2004/0181652 A1 | 9/2004 | Ahmed et al. |
| 2004/0216101 A1 | 10/2004 | Burky et al. |
| 2005/0060518 A1 | 3/2005 | Augsburg et al. |
| 2005/0138290 A1 | 6/2005 | Hammarlund et al. |
| 2006/0095710 A1 | 5/2006 | Pires Dos Reis Moreira et al. |
| 2006/0106923 A1 | 5/2006 | Balasubramonian et al. |
| 2006/0143513 A1 | 6/2006 | Hillman et al. |
| 2007/0022277 A1 | 1/2007 | Iwamura et al. |
| 2007/0079303 A1 | 4/2007 | Du et al. |
| 2007/0101102 A1 | 5/2007 | Dierks, Jr. et al. |
| 2007/0106874 A1 | 5/2007 | Pan et al. |
| 2007/0180221 A1 | 8/2007 | Abernathy et al. |
| 2007/0204137 A1 | 8/2007 | Tran |
| 2008/0098260 A1 | 4/2008 | Okawa et al. |
| 2008/0104375 A1 | 5/2008 | Hansen et al. |
| 2008/0133885 A1 | 6/2008 | Glew |
| 2008/0162889 A1 | 7/2008 | Cascaval et al. |
| 2008/0162895 A1 | 7/2008 | Luick |
| 2008/0172548 A1 | 7/2008 | Caprioli et al. |
| 2008/0270749 A1 | 10/2008 | Ozer et al. |
| 2008/0307182 A1 | 12/2008 | Arimilli et al. |
| 2008/0313424 A1 | 12/2008 | Gschwind |
| 2009/0037698 A1 | 2/2009 | Nguyen |
| 2009/0113182 A1 | 4/2009 | Abernathy et al. |
| 2009/0198921 A1 | 8/2009 | Chen et al. |
| 2009/0210675 A1* | 8/2009 | Alexander ............ G06F 9/3016 712/216 |
| 2009/0240929 A1* | 9/2009 | Hutton ................. G06F 9/30076 712/229 |
| 2009/0265532 A1 | 10/2009 | Caprioli et al. |
| 2009/0282225 A1 | 11/2009 | Caprioli et al. |
| 2009/0300319 A1 | 12/2009 | Cohen et al. |
| 2010/0100685 A1 | 4/2010 | Kurosawa et al. |
| 2010/0161945 A1 | 6/2010 | Burky et al. |
| 2010/0191940 A1 | 7/2010 | Mejdrich et al. |
| 2010/0262781 A1* | 10/2010 | Hrusecky ............ G06F 9/30043 711/119 |
| 2011/0078697 A1 | 3/2011 | Smittle et al. |
| 2012/0060015 A1* | 3/2012 | Eichenberger ...... G06F 15/8069 712/4 |
| 2012/0060016 A1* | 3/2012 | Eichenberger ...... G06F 9/30018 712/4 |
| 2012/0066482 A1 | 3/2012 | Gonion |
| 2012/0110271 A1 | 5/2012 | Boersma et al. |
| 2012/0110304 A1 | 5/2012 | Bryant et al. |
| 2012/0226865 A1 | 9/2012 | Choi et al. |
| 2012/0246450 A1 | 9/2012 | Abdallah |
| 2013/0254488 A1 | 9/2013 | Kaxiras et al. |
| 2013/0305022 A1* | 11/2013 | Eisen .................. G06F 9/30087 712/214 |
| 2013/0339670 A1* | 12/2013 | Busaba ............... G06F 9/30043 712/216 |
| 2014/0025933 A1 | 1/2014 | Venkataramanan et al. |
| 2014/0040599 A1* | 2/2014 | Fleischer ............ G06F 9/30036 712/205 |
| 2014/0075159 A1 | 3/2014 | Frigo et al. |
| 2014/0189243 A1 | 7/2014 | Cuesta et al. |
| 2014/0215189 A1 | 7/2014 | Airaud et al. |
| 2014/0223144 A1 | 8/2014 | Heil et al. |
| 2014/0244239 A1 | 8/2014 | Nicholson et al. |
| 2014/0281408 A1 | 9/2014 | Zeng |
| 2014/0282429 A1 | 9/2014 | Archer et al. |
| 2014/0325188 A1* | 10/2014 | Ogasawara .......... G06F 9/3834 712/217 |
| 2015/0046662 A1 | 2/2015 | Heinrich et al. |
| 2015/0121010 A1 | 4/2015 | Kaplan et al. |
| 2015/0121046 A1 | 4/2015 | Kunjan et al. |
| 2015/0134935 A1 | 5/2015 | Blasco |
| 2015/0199272 A1 | 7/2015 | Goel et al. |
| 2015/0324204 A1 | 11/2015 | Eisen et al. |
| 2015/0324205 A1 | 11/2015 | Eisen et al. |
| 2015/0324206 A1 | 11/2015 | Eisen et al. |
| 2015/0324207 A1 | 11/2015 | Eisen et al. |
| 2016/0070571 A1 | 3/2016 | Boersma et al. |
| 2016/0070574 A1 | 3/2016 | Boersma et al. |
| 2016/0092231 A1 | 3/2016 | Chu et al. |
| 2016/0092276 A1 | 3/2016 | Chu et al. |
| 2016/0103715 A1 | 4/2016 | Sethia et al. |
| 2016/0202986 A1 | 7/2016 | Ayub et al. |
| 2016/0202988 A1 | 7/2016 | Ayub et al. |
| 2016/0202989 A1 | 7/2016 | Eisen et al. |
| 2016/0202990 A1 | 7/2016 | Brownscheidle et al. |
| 2016/0202991 A1 | 7/2016 | Eisen et al. |
| 2016/0202992 A1 | 7/2016 | Brownscheidle et al. |
| 2016/0239307 A1 | 8/2016 | Alexander et al. |
| 2017/0168837 A1 | 6/2017 | Eisen et al. |
| 2017/0255465 A1 | 9/2017 | Chadha et al. |
| 2017/0277542 A1 | 9/2017 | Fernsler et al. |
| 2017/0300328 A1 | 10/2017 | Cordes et al. |
| 2017/0329641 A1 | 11/2017 | Chadha et al. |
| 2017/0329713 A1 | 11/2017 | Chadha et al. |
| 2017/0351521 A1 | 12/2017 | Hrusecky |
| 2017/0357507 A1 | 12/2017 | Cordes et al. |
| 2017/0357508 A1 | 12/2017 | Cordes et al. |
| 2017/0371658 A1 | 12/2017 | Eickemeyer et al. |
| 2018/0039577 A1 | 2/2018 | Chadha et al. |
| 2018/0067746 A1 | 3/2018 | Chu et al. |
| 2018/0260230 A1 | 9/2018 | Eickemeyer et al. |
| 2018/0276132 A1 | 9/2018 | Chadha et al. |
| 2018/0285161 A1 | 10/2018 | Chadha et al. |
| 2018/0293077 A1 | 10/2018 | Fernsler et al. |

FOREIGN PATENT DOCUMENTS

| | | |
|---|---|---|
| CN | 101876892 A | 11/2010 |
| CN | 102004719 A | 4/2011 |
| EP | 1212680 B1 | 7/2007 |
| GB | 2356324 A | 5/2001 |
| GB | 2356324 B | 10/2001 |
| JP | 2009157887 A | 7/2009 |
| WO | WO 2015/067118 A1 | 5/2015 |

OTHER PUBLICATIONS

Bobba et al., *Safe and Efficient Supervised Memory Systems*, 17th International Symposium on High Performance Computer Architecture (HPCA), Feb. 2011, 12 pages, IEEE xPlore Digital Library (online; IEEE.org), DOI: 10.1109/HPCA.2011.5749744.

Anonymous, "A Novel Data Prefetch Method Under Heterogeneous Architecture", IP.com Prior Art Database Technical Disclosure No. 000224167 (online), Dec. 2012, 14 pages, URL: http://ip.com/IPCOM/000224167.

Anonymous, "Method and System for Predicting Performance Trade-Offs During Critical Path Execution in a Processor", IP.com Prior Art Database Technical Disclosure No. 000223340 (online), Nov. 2012, 7 pages, URL: http://ip.com/IPCOM/000223340.

IBM, "Using a mask to block the wakeup of dependents of already-issued instructions", An IP.com Prior Art Database Technical Disclosure (online), IP.com No. 000193322, URL: http://ip.com/IPCOM/000193322, dated Feb. 18, 2010, 2 pages.

Anonymous, "Fast wakeup of load dependent instructions by a select bypass", An IP.com Prior Art Database Technical Disclosure (online), IP.com No. 000216900, URL: http://ip.com/IPCOM/000216900, dated Apr. 23, 2012, 2 pages.

Mathis et al., "Characterization of simultaneous multithreading (SMT) efficiency in POWER5", IBM Journal of Research and Development, Jul. 2005, pp. 555-564, vol. 49, No. 4/5, International Business Machines Corporation, Armonk, NY.

Sha et al., "Scalable Store-Load Forwarding via Store Queue Index Prediction", Proceedings of the 38th Annual IEEE/ACM International Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

(56) References Cited

OTHER PUBLICATIONS

Appendix P; List of IBM Patent or Applications Treated as Related, Sep. 23, 2016, 2 pages.
U.S. Appl. No. 15/152,257, to Sundeep Chadha et al., entitled, *Operation of a Multi-Slice Processor Implementing a Load/Store Unit Maintaining Rejected Instructions*, assigned to International Business Machines Corporation, 37 pages, filed May 11, 2016.
U.S. Appl. No. 15/180,828, to Robert A. Cordes et al., entitled, *Operation of a Multi-Slice Processor Implementing Simultaneous Two-Target Loads and Stores*, assigned to International Business Machines Corporation, 37 pages, filed Jun. 13, 2016.
U.S. Appl. No. 15/193,338, to Richard J. Eickemeyer et al., entitled, *Managing a Divided Load Reorder Queue*, assigned to International Business Machines Corporation, 35 pages, filed Jun. 27, 2016.
U.S. Appl. No. 15/230,532, to Sundeep Chadha et al., entitled, *Flush Avoidance in a Load Store Unit*, assigned to International Business Machines Corporation, 37 pages, filed Aug. 8, 2016.
U.S. Appl. No. 15/219,638, to Robert A. Cordes et al., entitled, *Operation of a Multi-Slice Processor Implementing Simultaneous Two-Target Loads and Stores*, assigned to International Business Machines Corporation, 37 pages, filed Jul. 26, 2016.
U.S. Appl. No. 15/221,035, to Sundeep Chadha et al., entitled, *Operation of a Multi-Slice Processor Implementing a Load/Store Unit Maintaining Rejected Instructions*, assigned to International Business Machines Corporation, 37 pages, filed Jul. 27, 2016.
Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.
Anonymous, *Method and system for Implementing "Register Threads" in a Simultaneously-Multithreaded (SMT) Processor Core*, an IP.com Prior Art Database Technical Disclosure, IP.com No. IPCOM000199825D IP.com Electronic Publication: Sep. 17, 2010 pp. 1-4 <http://ip.com/IPCOM/000199825>.
Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.
Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.
Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-765, vol. 1685, Spring Berlin Heidelberg, Toulouse, France.
Pechanek et al., *The ManArray Embedded Processor Architecture*, Proceedings of the 26 Euromicro Conference, IEEE Computer Society, Sep. 5-7, 2000, pp. 348-355, vol. 1, Maastricht.
Anonymous, *Precise Merging Translation Queue in a Slice-Based Processor*, An IP.com Prior Art Database Technical Disclosure, IP.com No. IPCOM000249317D IP.com Electronic Publication: Feb. 16, 2017, pp. 1-3. <https://priorart.ip.com/IPCOM/000249317>.
International Search Report and Written Opinion, PCT/IB2015/052741, Oct. 9, 2015.
Kalla, et al., "IBM Power5 Chip: A Dual-Core Multithreaded Processor", IEEE Micro, vol. 24, No. 2, Mar. 2004, pp. 40-47, IEEE Xplore Digital Library (online), DOI: 10.1109/MM.2004.1289290.
Appendix P; List of IBM Patent or Applications Treated as Related, Aug. 28, 2018, 2 pages.
U.S. Appl. No. 15/995,850, to Sundeep Chadha et al., entitled, *Operation of a Multi-Slice Processor Implementing a Load/Store Unit Maintaining Rejected Instructions*, assigned to International Business Machines Corporation, 37 pages, filed Jun. 1, 2018.
U.S. Appl. No. 15/997,863, to Sundeep Chadha et al., entitled, *Operation of a Multi-Slice Processor Implementing a Load/Store Unit Maintaining Rejected Instructions*, assigned to International Business Machines Corporation, 37 pages, filed Jun. 5, 2018.
U.S. Appl. No. 16/003,950, to Kimberly M. Fernsler et al., entitled, *Operation of a Multi-Slice Processor With an Expanded Merge Fetching Queue*, assigned to International Business Machines Corporation, 35 pages, filed Jun. 8, 2018.
Slota et al., *Complex Network Analysis using Parallel Approximate Motif Counting*, 2014 IEEE 28th International Parallel & Distributed Processing Symposium, DOI: 10.1109/IPDPS.2014.50, Date Added to IEEE Xplore: Aug. 14, 2014, 10 pages.
Gorentla et al., *Exploring the All-to-All Collective Optimization Space with ConnectX CORE-Direct*, IEEE, 2012 41st International Confererence on Parallel Processing, DOI: 10.1109/ICPP.2012.28, Date Added to IEEE Xplore: Oct. 25, 2012, 10 pages.

\* cited by examiner

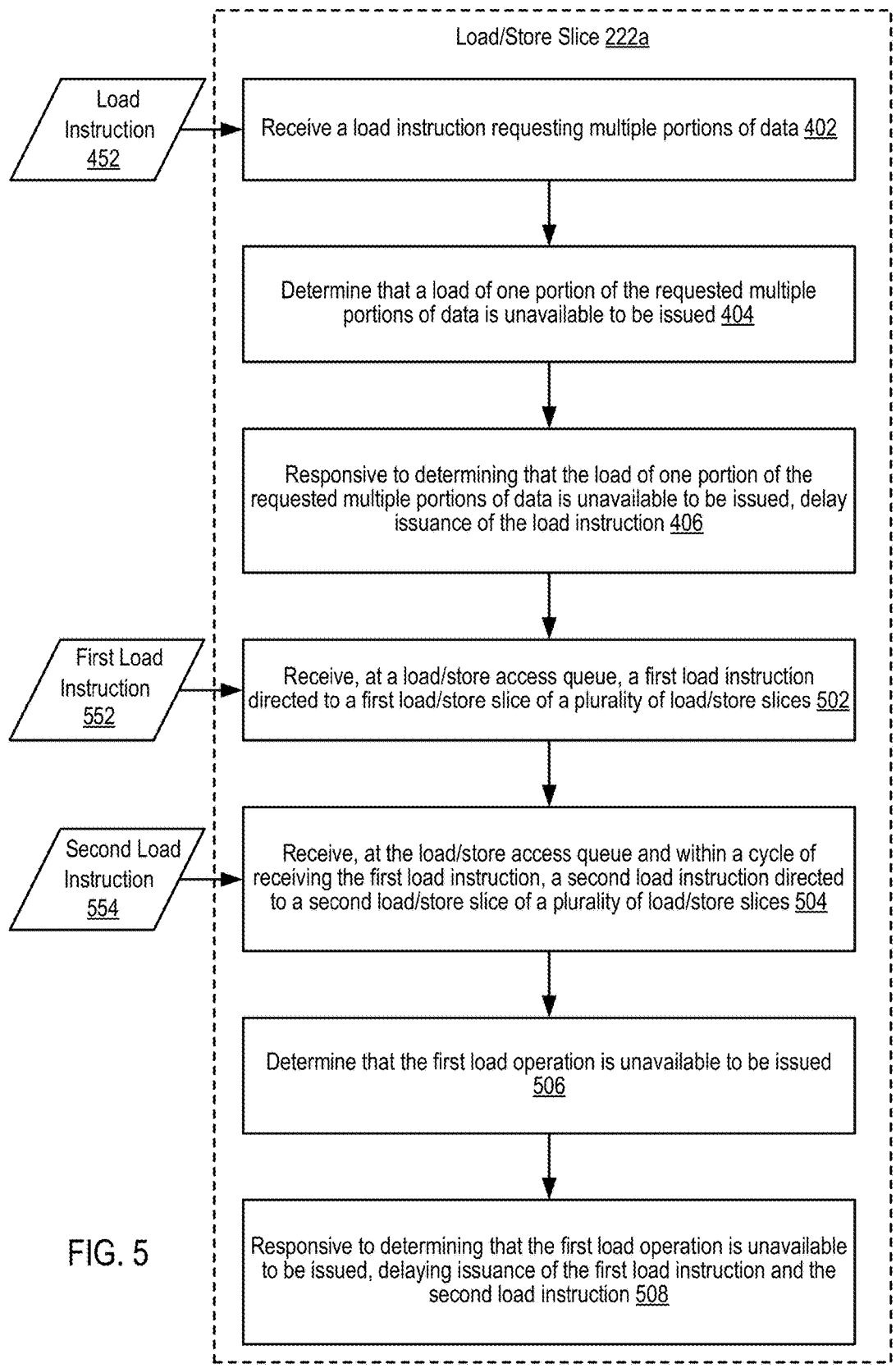

US 10,346,174 B2

OPERATION OF A MULTI-SLICE PROCESSOR WITH DYNAMIC CANCELING OF PARTIAL LOADS

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices configured to dynamically cancel partial load operations. Operation of such a multi-slice processor includes: receiving a load instruction requesting multiple portions of data; receiving a load instruction requesting multiple portions of data; determining that a load of one portion of the requested multiple portions is unavailable to be issued; and responsive to determining that the load of the one portion of the requested multiple portions is unavailable to be issued, delaying issuance of the load instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 5 sets forth a flow chart illustrating an exemplary method of operation of a multi-slice processor in which a load/store slice is configured to dynamically cancel partial load operations according to different embodiments.

DETAILED DESCRIPTION

Figure 1:
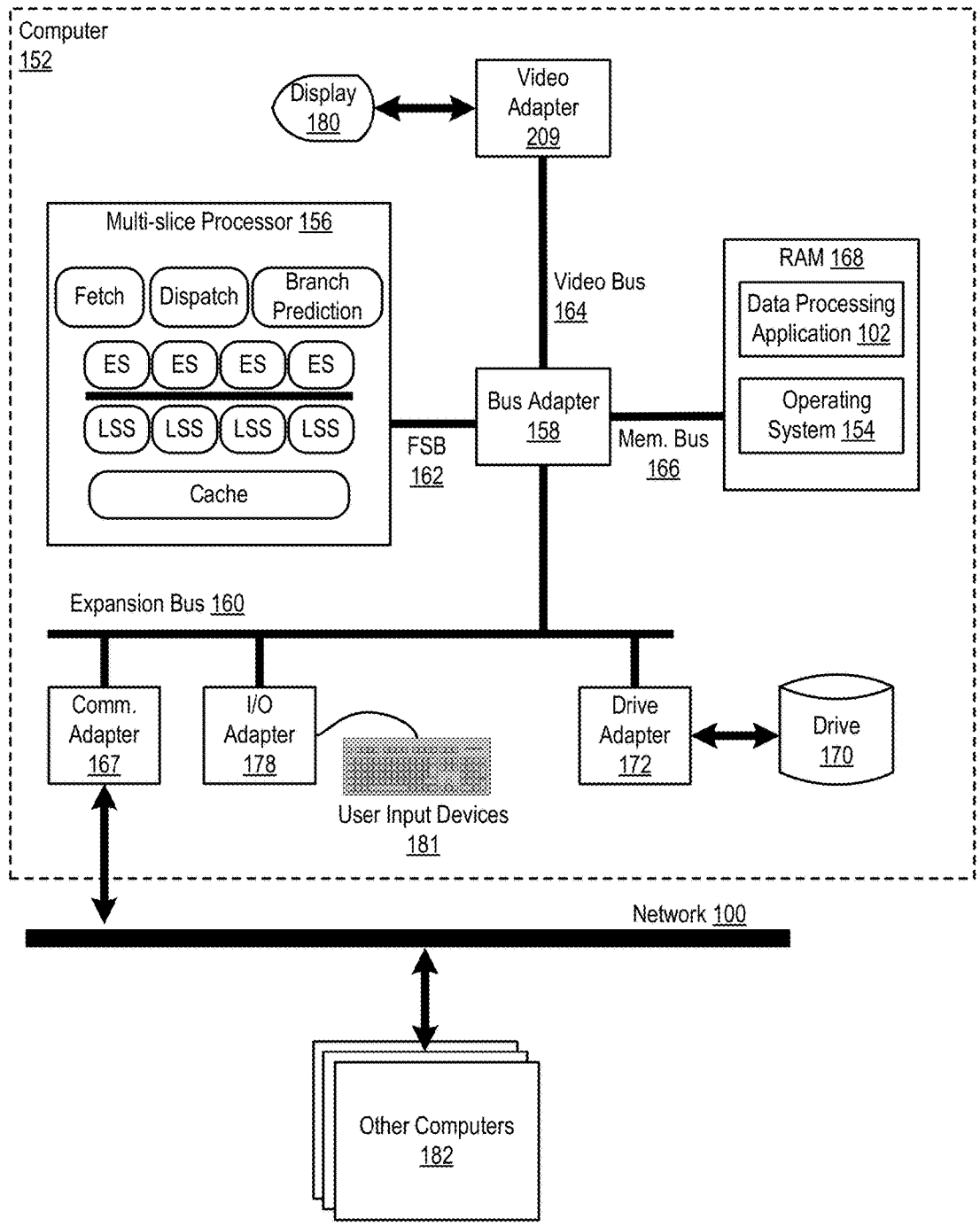
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
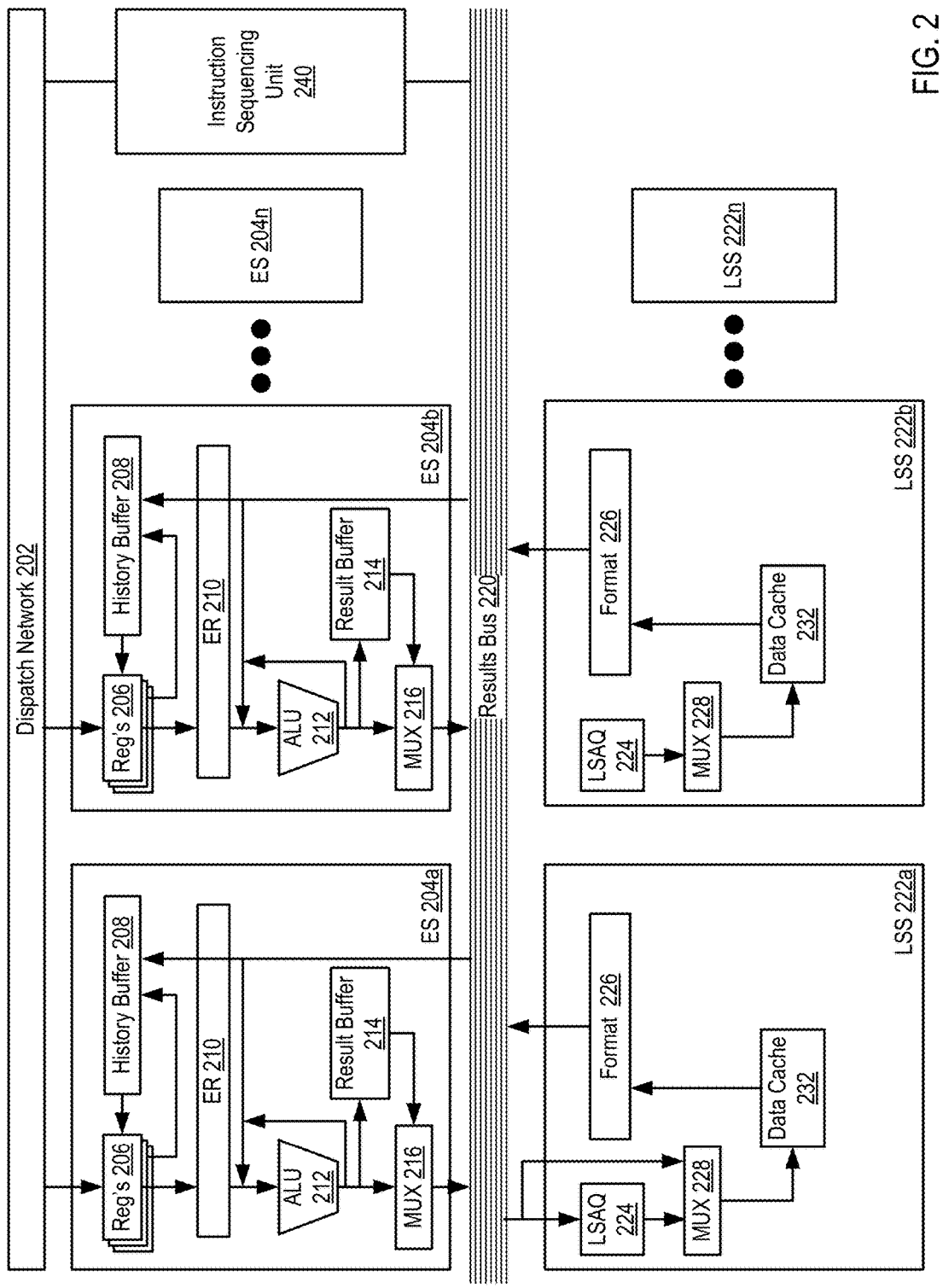
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice, as discussed below with regard to FIG. 3.

Figure 3:
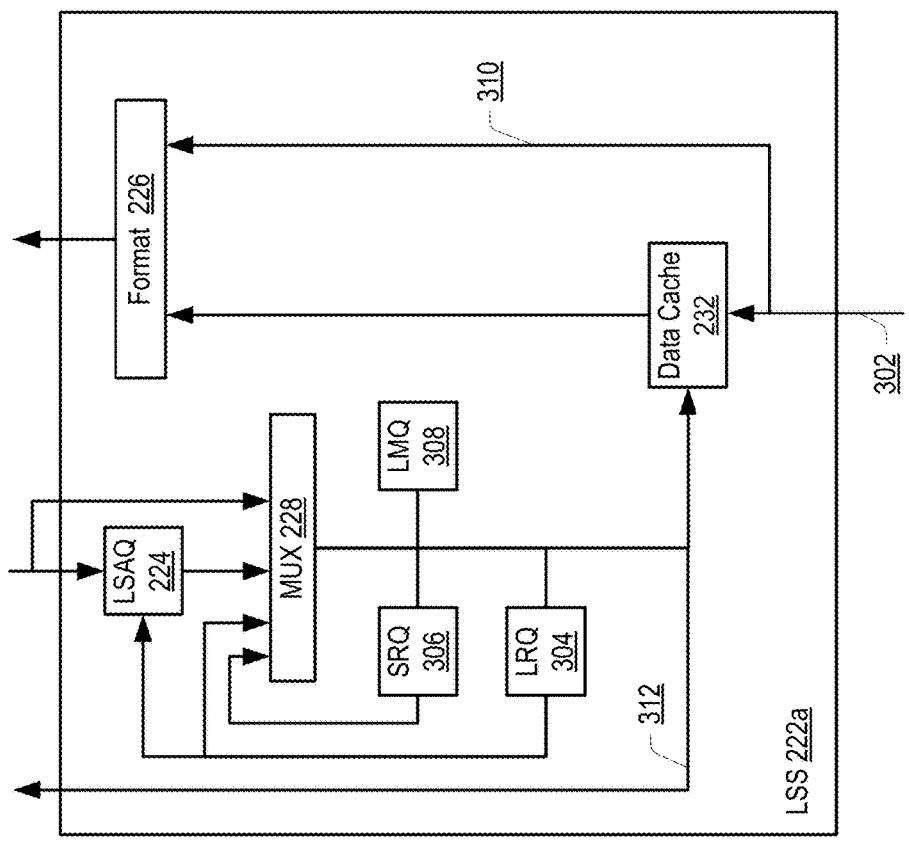
FIG. 3 sets forth a block diagram of a portion of a load/store slice of a multi-slice processor, where the load/store slice is configured to dynamically cancel partial load operations according to different embodiments.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), among other components.

The load/store access queue (224) may receive load instructions that are subsequently provided to one or two load/store slices. Similarly, the load reorder queue (304) may handle load operations for a single load/store slice or two load/store slices. In some cases, the load/store access queue (224) may receive a two-slice load, and be unable to send both halves of the two-sliced load to the load reorder queue (304) simultaneously. For example, one reason for the inability to send both halves to the load reorder queue (304) is that the load reorder queue (304) may reissue an older load operation on one slice, where the older load operation gets priority over a younger issued load operation. Such an example may incur a multicycle penalty upon reissuance. Consequently, because the load/store access queue (224) is configured to recognize such instances where a two-sliced load is to be reissued, the load/store access queue (224)—instead of issuing the two-sliced load that may not complete—delays issuing the two-sliced load to the load reorder queue. In this way, a smaller penalty in execution cycles is incurred if the load/store access queue (224), cancels issuing the load instead of issuing the load to the load reorder queue (304) so that the load reorder queue (304) cancels and reissues the load.

The load/store access queue (304), in addition to canceling, or delaying, the launch of the load operation, may also block generation of a signal to the instruction sequencing unit (240) indicating that the issue of the load instruction is valid, thereby allowing the instruction sequencing unit (240) to not wake dependent instructions prematurely.

The load/store access queue (224) may also dynamically enable or disable the canceling mechanism of loads between the load/store access queue (224) and the load reorder queue (304). For example, the load/store access queue (224) may determine that a quantity of recycle operations is above a threshold quantity, and in response, the load/store access queue (224) may disable dynamic canceling of load operations. Similarly, if the load/store access queue (224) determines that a quantity of recycle operations is below the threshold quantity, in response, the load/store access queue (224) may enable dynamic canceling of load operations. The threshold quantity may be based at least in part on whether it would incur a greater cycle penalty to dynamically cancel a load operation by the load/store access queue (224) or to cancel a load operation as part of a reissue from the load reorder queue (304).

The load/store slice (222a) may receive load instructions and communicate with the instruction sequencing unit (240) with regard to the progress toward completion of one or more instructions. The instruction sequencing unit (240), based at least in part on communications with the load/store slice (222a), may determine when and whether to wake instructions that may be dependent on a current instruction being handled by the load/store slice (222a).

The load/store slice (222a) may determine one or more situations where a delay of a notification to the instruction sequencing unit (240) to awaken dependent instructions may prevent the instruction sequencing unit (240) from issuing dependent instructions that are subsequently unable to finish due to lack of availability of results from a current instruction. In this way, the instruction sequencing unit (240) may avoid wasting execution cycles reissuing dependent instructions that are unable to finish.

For example, the load/store slice (222a) may communicate with the instruction sequencing unit (240) through the generation of signals indicating, at different points in handling a load instruction, that a load instruction is to be reissued or that data for a load instruction is valid. In some cases, in response to the instruction sequencing unit (240) receiving a signal from the load/store slice (222a) that a given instruction is to be reissued, the instruction sequencing unit (240) may awaken instructions dependent upon the given instruction with the expectation that the given instruction, after being reissued, is going to finish and provide valid data.

However, in some cases, execution cycles may be saved if the load/store slice (222a) delays sending the instruction sequencing unit (240) such a notification—where the delay may be based on determining that a reissued instruction may not yet have data available, which would prevent the reissued instruction from completing.

The load/store slice (222a) may also retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit (not shown), or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Figure 4:
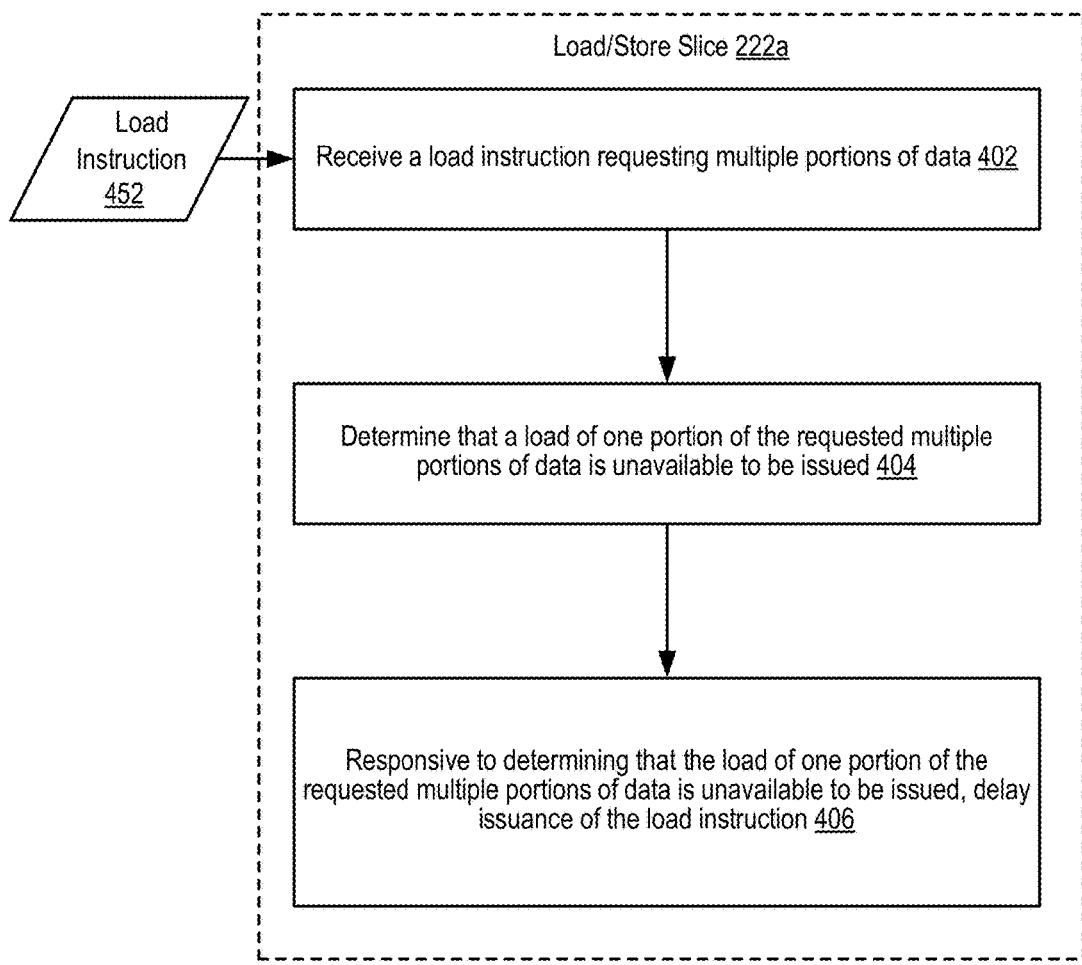
FIG. 4 sets forth a flow chart illustrating an exemplary method of operation of a multi-slice processor in which a load/store slice is configured to dynamically cancel partial load operations according to different embodiments.

For further explanation, FIG. 4 sets forth a flow chart illustrating an exemplary method of operation of a multi-slice processor configured to dynamically cancel partial load operations. The method of FIG. 4 may be carried out by a multi-slice processor similar to that in the examples of FIGS. 2 and 3. Such a multi-slice processor may include a plurality of load/store slices, where a single load/store access queue and a single load reorder queue may operate together to handle load operations, as described above with regard to FIG. 3.

The method of FIG. 4 includes receiving (402) a load instruction (452) requesting multiple portions of data. Receiving (402) the load instruction may be carried out by the load/store access queue (224) receiving a two-slice load operation or receiving two load operations within a single cycle that may be launched or issued together. Under normal operating conditions, the two-slice load operation may be provided to the load reorder queue (304), where the two-slice load operation is issued by the load reorder queue (304) without recycling, and where the two-slice load operation occupies a single entry from among multiple entries of the load reorder queue (304). Similarly, under normal conditions, two load operations arriving within a cycle of each other may be issued by the load reorder queue (304) without recycling, where a load that satisfies both load operations may be issued in a single operation, and where the two loads occupy a single entry from among the multiple entries of the load reorder queue (304).

The method of FIG. 4 also includes determining (404) that a load of one portion of the requested multiple portions of data is unavailable to be issued. Determining (404) that the load of one portion of the requested multiple portions of data is unavailable to be issued may be carried out by the load/store access queue (224) determining that at least one of the slices is likely to recycle the load operation. For example, the load/store access queue (224) may determine that the load reorder queue (304) is to recycle an older instruction that would also recycle at least one half of the two-slice load, among other reasons The method of FIG. 4 also includes, responsive to determining that the load of one portion of the requested multiple portions of data is unavailable to be issued, delaying (406) issuance of the load instruction. Delaying (406) issuance of the load instruction may be carried out by the load/store access queue canceling propagating any part of the two-slice load to the load reorder queue (304).

In this example, if the load/store access queue (224) delays a predetermined or variable quantity of cycles before propagating the two-slice load operation to the load reorder queue (304), then the load/store access queue (224) may issue the two-slice load sooner than if the load/store access queue (224) had issued the two-slice load and the load reorder queue had subsequently recycled the two-slice load. The variable quantity of cycles may be based on a number of cycles up to which it would be more efficient for the load/store access queue (224) to cancel the two-slice load as compared to the load reorder queue (304) recycling the two-slice load. In other words, the load/store access queue (224) may base a determination on whether to cancel a partial load on a determination that cycles may be saved by canceling a partial load if less than the entire load is to be launched.

In this way, the load/store access queue (224) determines whether dynamically canceling a partial load or propagating a load to a load reorder queue is the most efficient manner in which to satisfy the received load operation.

For further explanation, FIG. 5 sets forth a flow chart illustrating an exemplary method of operation of a multi-slice processor in which a load/store slice is configured to dynamically cancel partial load operations. The method of FIG. 4 may be carried out by a multi-slice processor similar to that in the examples of FIGS. 2 and 3. Such a multi-slice processor may include a plurality of load/store slices, where a single load/store access queue and a single load reorder queue may operate together to handle load operations, as described above with regard to FIG. 3.

The method of FIG. 5 is similar to the method of FIG. 4 in that the method of FIG. 5 also includes receiving (402) a load instruction (452) requesting multiple portions of data; determining (404) that a load of one portion of the requested multiple portions of data is unavailable to be issued; and responsive to determining that the load of one portion of the requested multiple portions of data is unavailable to be issued, delaying (406) issuance of the load instruction.

The method of FIG. 5 differs from the method of FIG. 4, however, in that the method of FIG. 5 includes receiving (502), at the load/store access queue (224), a first load instruction (552) directed to a first load/store slice of a plurality of load/store slices. Receiving (502) the first load instruction (552) may be carried out by the load/store access queue (224) receiving a load instruction directed to one load/store slice of a superslice, where a superslice may be considered to be two adjacent, and architecturally related, load/store slices. For example, in a multi-slice processor with eight slices, and eight load/store slices, the superslice pairs may be {slice 0, slice 1}, {slice 2, slice 3}, {slice 4, slice 5}, and {slice 6, slice 7}. In this case, the first load instruction may be directed to load/store slice 0.

The method of FIG. 5 also includes receiving (504), at the load/store access queue (224) and within a cycle of receiving the first load instruction, a second load instruction (554) directed to a second load/store slice of a plurality of load/store slices. Receiving (504) the second load instruction, similar to receiving the first load instruction, may be carried out by the load/store access queue (224) receiving a load instruction directed to another load/store slice of the superslice that received the first load instruction. In this case, the second load instruction is directed to load/store slice 1.

The method of FIG. 5 also includes determining (506) that the first load operation is unavailable to be issued. Determining (506) that the first load operation is unavailable to be issued may be carried out by the load/store access queue (224) determining that at least one of the slices is likely to recycle the load operation, as discussed above with regard to FIG. 4. While this example the first load instruction is directed to load/store slice 0, in other examples, the first load instruction may be directed to the other pair of the load/store superslice, and similar operation applies to any of the load/store superslices.

The method of FIG. 5 also includes, responsive to determining that the first load operation is unavailable to be issued, delaying (508) issuance of the first load instruction and the second load instruction. Delaying (508) issuance of the first load instruction and the second load instruction may be carried out by the load/store access queue canceling propagating both the first load instruction and the second load instruction to the load reorder queue (304), as discussed above with regard to FIG. 4.

In this way, the load/store access queue (224) determines whether dynamically canceling two received load instructions to a superslice or propagating both loads to a load reorder queue is the most efficient manner in which to satisfy the received load operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, a plurality of load/store slices, a load/store access queue, and a load reorder queue, the method comprising:
    receiving, at the load/store access queue, a load instruction requesting multiple portions of data, wherein the load instruction is a two-slice load instruction for two load/store slices of the plurality of load/store slices;
    determining, by the load/store access queue, that a load of one portion of the requested multiple portions is likely to be recycled by the load reorder queue for only one of the two load/store slices and is therefore unavailable to be issued; and
    responsive to determining that the load of the one portion of the requested multiple portions is unavailable to be issued, delaying, by the load/store access queue, issuance of the load instruction for both of the two load/store slices to the load reorder queue.

2. The method of claim 1, wherein the load/store access queue delaying issuance of the load instruction is based on a determination that a smaller penalty of execution cycles is incurred by delaying issuance of the load instruction than by issuing the load instruction to the load reorder queue.

3. The method of claim 1, wherein determining that the load of one portion of the requested multiple portions is unavailable to be issued comprises determining, by the load/store access queue, that the load of one portion of the requested multiple portions is unavailable to be issued to the load reorder queue.

4. The method of claim 1, wherein determining, by the load/store access queue, that a load of one portion of the requested multiple portions is likely to be recycled by the load reorder queue for only one of the two load/store slices includes determining that the load reorder queue is to recycle an older instruction that would also recycle at least one half of the two-slice load instruction.

5. The method of claim 4, wherein delaying issuance of the load instruction comprises the load/store access queue delaying issuance of the load instruction until all portions of the load instruction are ready to be issued by the load reorder queue.

6. The method of claim 4, further comprising:
receiving, at the load/store access queue, a first load instruction directed to a first load/store slice of the plurality of load/store slices;
receiving, at the load/store access queue and within a cycle of receiving the first load instruction, a second load instruction directed to a second load/store slice of the plurality of load/store slices;
determining, by the load/store access queue, that the first load operation is unavailable to be issued; and
responsive to determining that the first load operation is unavailable to be issued, delaying, by the load/store access queue, issuance of the first load instruction and the second load instruction.

7. The method of claim 1, wherein further in response to determining that the load of the one portion of the requested multiple portions is unavailable to be issued, delaying notification of an issue valid signal to an instruction sequencing unit of the multi-slice processor.

8. A multi-slice processor comprising:
a plurality of execution slices, a plurality of load/store slices, a load/store access queue, and a load reorder queue, wherein the multi-slice processor is configured to carry out:
receiving, at the load/store access queue, a load instruction requesting multiple portions of data, wherein the load instruction is a two-slice load instruction for two load/store slices of the plurality of load/store slices;
determining, by the load/store access queue, that a load of one portion of the requested multiple portions is likely to be recycled by the load reorder queue for only one of the two load/store slices and is therefore unavailable to be issued; and
responsive to determining that the load of the one portion of the requested multiple portions is unavailable to be issued, delaying, by the load/store access queue, issuance of the load instruction for both of the two load/store slices to the load reorder queue.

9. The multi-slice processor of claim 8, wherein the load/store access queue delaying issuance of the load instruction is based on a determination that a smaller penalty of execution cycles is incurred by delaying issuance of the load instruction than by issuing the load instruction to the load reorder queue.

10. The multi-slice processor of claim 8, wherein determining that the load of one portion of the requested multiple portions is unavailable to be issued comprises determining, by the load/store access queue, that the load of one portion of the requested multiple portions is unavailable to be issued to the load reorder queue.

11. The multi-slice processor of claim 8, wherein determining, by the load/store access queue, that a load of one portion of the requested multiple portions is likely to be recycled by the load reorder queue for only one of the two load/store slices includes determining that the load reorder queue is to recycle an older instruction that would also recycle at least one half of the two-slice load instruction.

12. The multi-slice processor of claim 11, wherein delaying issuance of the load instruction comprises the load/store access queue delaying issuance of the load instruction until all portions of the load instruction are ready to be issued by the load reorder queue.

13. The multi-slice processor of claim 11, wherein the multi-slice processor is further configured to carry out:
receiving, at the load/store access queue, a first load instruction directed to a first load/store slice of the plurality of load/store slices;
receiving, at the load/store access queue and within a cycle of receiving the first load instruction, a second load instruction directed to a second load/store slice of the plurality of load/store slices;
determining, by the load/store access queue, that the first load operation is unavailable to be issued; and
responsive to determining that the first load operation is unavailable to be issued, delaying, by the load/store access queue, issuance of the first load instruction and the second load instruction.

14. The multi-slice processor of claim 8, wherein further in response to determining that the load of the one portion of the requested multiple portions is unavailable to be issued, delaying notification of an issue valid signal to an instruction sequencing unit of the multi-slice processor.

15. An apparatus comprising:
a multi-slice processor that includes a plurality of execution slices, a plurality of load/store slices, a load/store access queue, and a load reorder queue, wherein the multi-slice processor is configured to carry out:
receiving, at the load/store access queue, a load instruction requesting multiple portions of data, wherein the load instruction is a two-slice load instruction for two load/store slices of the plurality of load/store slices;
determining, by the load/store access queue, that a load of one portion of the requested multiple portions is likely to be recycled by the load reorder queue for only one of the two load/store slices and is therefore unavailable to be issued; and
responsive to determining that the load of the one portion of the requested multiple portions is unavailable to be issued, delaying, by the load/store access queue, issuance of the load instruction for both of the two load/store slices to the load reorder queue.

16. The apparatus of claim 15, wherein the load/store access queue delaying issuance of the load instruction is based on a determination that a smaller penalty of execution cycles is incurred by delaying issuance of the load instruction than by issuing the load instruction to the load reorder queue.

17. The apparatus of claim 15, wherein determining that the load of one portion of the requested multiple portions is unavailable to be issued comprises determining, by the load/store access queue, that the load of one portion of the requested multiple portions is unavailable to be issued to the load reorder queue.

18. The apparatus of claim 15, wherein determining, by the load/store access queue, that a load of one portion of the requested multiple portions is likely to be recycled by the load reorder queue for only one of the two load/store slices includes determining that the load reorder queue is to recycle an older instruction that would also recycle at least one half of the two-slice load instruction.

19. The apparatus of claim 18, wherein delaying issuance of the load instruction comprises the load/store access queue delaying issuance of the load instruction until all portions of the load instruction are ready to be issued by the load reorder queue.

20. The apparatus of claim 18, wherein the multi-slice processor is further configured to carry out:

receiving, at the load/store access queue, a first load instruction directed to a first load/store slice of the plurality of load/store slices;

receiving, at the load/store access queue and within a cycle of receiving the first load instruction, a second load instruction directed to a second load/store slice of the plurality of load/store slices;

determining, by the load/store access queue, that the first load operation is unavailable to be issued; and responsive to determining that the first load operation is unavailable to be issued, delaying, by the load/store access queue, issuance of the first load instruction and the second load instruction.

\* \* \* \* \*